US006438357B1

(12) United States Patent
Oh et al.

(10) Patent No.: US 6,438,357 B1
(45) Date of Patent: Aug. 20, 2002

(54) AIR INTERFACE SIMULATOR AND METHOD THEREOF

(75) Inventors: Soo-yeul Oh; Ki-seong Jang, both of Sungnam (KR)

(73) Assignee: Samsung Electronics, Co., Ltd. (KR)

( * ) Notice: Subject to any disclaimer, the term of this patent is extended or adjusted under 35 U.S.C. 154(b) by 0 days.

(21) Appl. No.: 09/324,426

(22) Filed: Jun. 1, 1999

(30) Foreign Application Priority Data

May 30, 1998 (KR) ............................................ 98-20140

(51) Int. Cl.⁷ .............................................. H04B 17/00
(52) U.S. Cl. ...................... 455/67.4; 455/560; 455/67.3; 455/423; 455/424; 455/67.1; 379/10.01; 379/24; 379/27.04; 375/224
(58) Field of Search ................................ 455/423, 424, 455/67.1, 67.3, 67.5, 67.4, 560, 561; 375/220, 224; 379/24, 10.1, 10.2, 10.3, 27.04, 29.02

(56) References Cited

U.S. PATENT DOCUMENTS 5,465,393 A * 11/1995 Frostrom et al. .......... 455/54.1
6,128,474 A * 10/2000 Kim et al. ................. 455/67.1

* cited by examiner

Primary Examiner—William Trost
Assistant Examiner—Danh Le
(74) Attorney, Agent, or Firm—Dilworth & Barrese, LLP

(57) ABSTRACT

An air interface simulator and simulation method is disclosed. The air interface simulator comprises a first plurality of variable attenuators for equally providing a mobile station with a transmission signal received from base transceiver station (BTS) before the air interface simulator starts driving, a plurality of attenuators for generating path loss to prevent power of the mobile station from being excessively input to said BTS and to construct an air environment, a first plurality of 2-way dividers for generating an input terminal for providing load in a reverse link of the BTS and combining the provided load and a RF signal of the mobile station, a plurality of duplexers for duplexing a transmission signal and a received signal of the BTS into a RF signal of the mobile station, a second plurality of variable attenuators for generating path loss and long-term effect, a first plurality of 4-way dividers for combing input signals from each BTS, a second plurality of 4-way dividers for combining input signals from each mobile station and a decoder circuit for controlling the first and second plurality of variable attenuators, the decoder circuit being provided with control input from a parallel port of a control computer.

16 Claims, 4 Drawing Sheets

AIR INTERFACE SIMULATOR AND METHOD THEREOF

BACKGROUND OF THE INVENTION

1. Field of the Invention

The present invention relates generally to wireless communication, and more particularly to a method and apparatus for simulating the performance of a wireless environment by a wire environment between base transceiver stations (BTSs) of a digital cellular system/personal communication services system.

2. Description of the Related Art

A characteristic of prior art cellular systems is that handoffs inevitably occur because of frequency re-use. Also, in a code division multiple access (CDMA) system based on reuse of frequency according to pseudo noise (PN) so that handoff occurs more frequently. Therefore, stable embodiment of handoffs in a cellular system is a primary concern in the development of a mobile communication system.

A conventional handoff test which is commonly applied in the development of a base transceiver station (BTS) operates by constructing a test cell, which is dedicated to handoff. A tester moves between cells simulating an actual subscriber of a mobile communication system. Obtaining a reliable measure of an exact handoff through the aforementioned handoff test method is difficult due to the changing cell environment. Additionally, the method is deficient in that it requires considerable labor, time and capital investment.

A method is disclosed in U.S. Pat. No. , 5,465,393 entitled Simulated Air Interface System for Simulating Radio Communication, the method is disclosed for an air interface simulation between base transceiver stations (BTSS) and mobile stations in a radio communication system. The air interface includes a directional coupler for splitting a radio path between a mobile station and base transceiver station, a plurality of dividers, a plurality of combiners and a plurality of generators. Also, for control of the generators, a plurality of computers are provided.

According to the above prior art, a reliable handoff simulation is impossible in a restricted room (i.e., laboratory). There exists a need, therefore, for a stable system with good quality and software and hardware need to be continuously developed.

SUMMARY OF THE PRESENT INVENTION

It is therefore an object of the present invention to provide a method and system for an air interface simulation to enable early completion of the development of a cellular system by providing a rapid and consistent handoff and field environment in a laboratory setting.

It is an another object of the present invention to reduce unnecessary capital investment, time and labor on a cell dedicated exclusively to handoff testing.

According to one embodiment of the present invention, an air interface simulator comprises a first plurality of variable attenuators for equally providing a mobile station with a transmission signal received from a base transceiver station (BTS) before the air interface simulator starts driving, a plurality of attenuators for generating path loss to prevent power of the mobile station from being excessively inputted to the BTS and to construct an air environment, a first plurality of 2-way dividers for generating an input terminal for providing load in a reverse link of the BTS and combining the provided load and a RF signal of the mobile station, a plurality of duplexers for duplexing a transmission signal and a received signal of the BTS into a RF signal of the mobile station, a second plurality of variable attenuators for generating path loss and long-term effect, the second plurality of variable attenuators being connected to said plurality of duplexers, respectively, a first plurality of 4-way dividers for combing input signals from each BTS, a second plurality of 4-way dividers for combining input signals from each mobile station, transmitting the combined signal to the first plurality of 4-way dividers and a decoder circuit for controlling the first and second plurality of variable attenuators, the decoder circuit being provided with control input from a parallel port of a control computer.

According to another embodiment of the present invention, a method for air interface simulation in a forward link, comprises the steps of providing a transmission signal of each base transceiver station (BTS) to a first variable attenuator, transmitting an output of the first variable attenuator to a duplexer, attenuating an output of the duplexer at a second variable attenuator and combining the attenuated signal through a 4-way divider after the attenuation and dividing again the combined signal again to each mobile station.

According to another embodiment of the present invention, a method for air interface simulation in a forward link, comprises the steps of providing a radio frequency (RF) signal of a mobile station to a 4-way divider, dividing the RF signal into the same level wherein the RF signal is provided to the 4-way divider, attenuating the divided RF signals by a variable attenuator, providing the attenuated RF signals to a duplexer, combining the output signal of the duplexer with an addictive white gaussian noise (AWGN) signal, providing the combined signal to an attenuator, dividing output signal of the attenuator into 2 paths using 2 WD and providing the divided value to an input port of the base transceiver station.

The present invention advantageously streamlines the development of a cellular system more quickly via a simulation method. The present invention can assess whether a proposed cellular system will operate well in a real air environment, thereby saving time and expense in system development.

DETAILED DESCRIPTION OF THE PRESENT INVENTION

Figure 1:
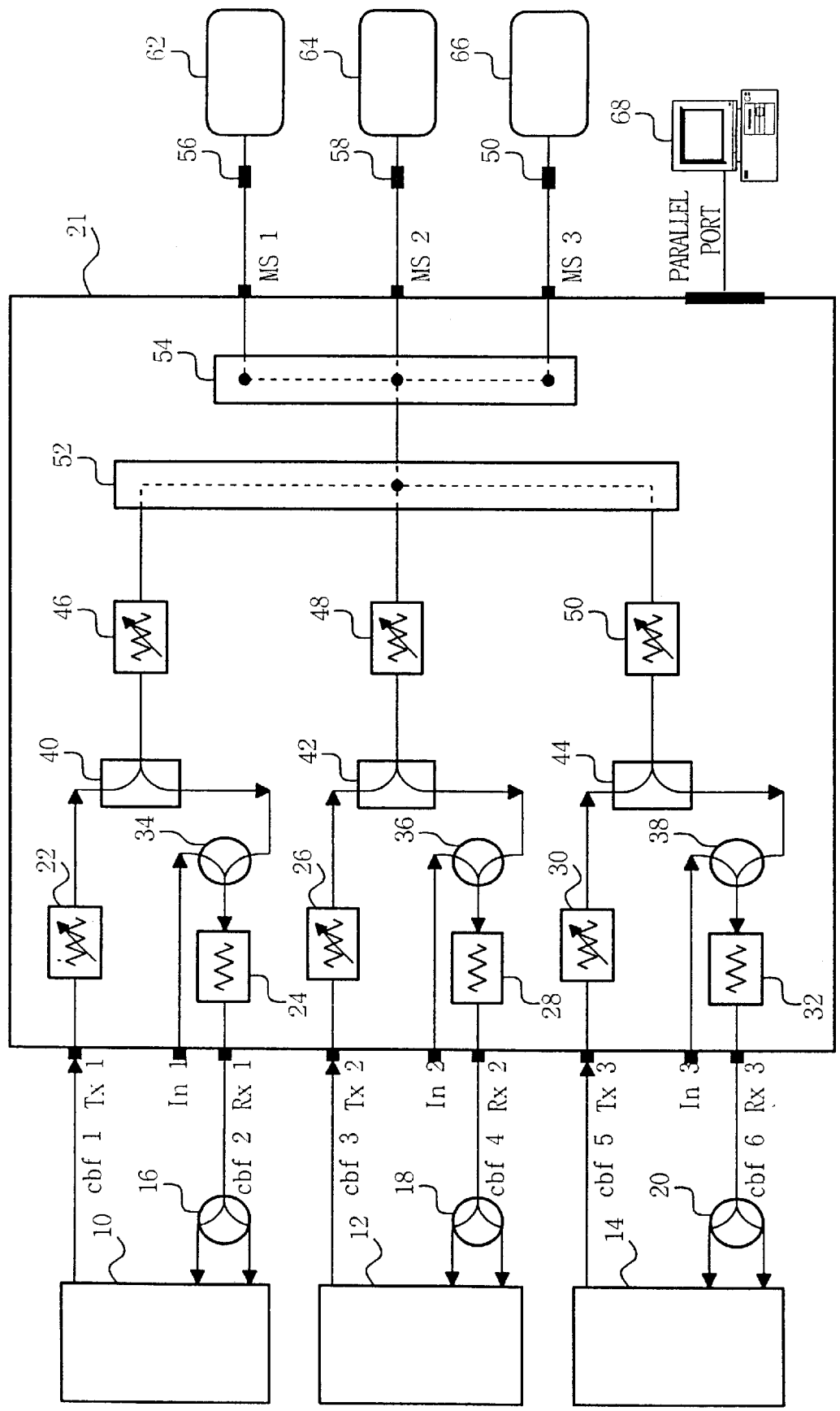
FIG. 1 is a block diagram to illustrate an air interface simulator according to a preferred embodiment of the present invention.

Referring initially to FIG. 1, a schematic diagram of an air interface simulator is illustrated in accordance with a preferred embodiment of the present invention. As shown, it is possible to construct a simulated handoff environment for a maximum of 3 sectors (cells).

Stated generally, the present invention provides an effective and controllable test environment to simulate a soft handoff, softer handoff and a hard handoff between cells, between a sector and a cell and between two sectors. but in a laboratory environment to reduce the expenditure of time and labor and to further automate a variety of cooperation tests necessary in the development of DCS and PCS systems.

As shown in FIG. 1, the air inteface simulator includes a plurality of variable attenuators 22, 26, 30, 46, 48 and 50, a first plurality of 2-way dividers 34, 36 and 38, a plurality of attenuators 24, 28 and 32, a plurality of duplexers 40,42, 44, a plurality of 4-way dividers 52 and 54, and a decoder circuit.

Three of the variable attenuators 22, 26 and 30 are used for calibrating a signal transmitted from the BTSs 10, 12, 14 and are further used for attenuating the signal received from the BTSs 10, 12, 14 prior to the signal being transmitted to the mobile stations 62, 64, 66. The calibration is performed before the air interface driving simulation begins. The variable attenuators (calibration ATTs) 22, 26 and 30 are set to a proper attenuation value, which are controlled by a binary code which is provided from the decoder circuit 21. The controlling range of the variable attenuators 22, 26 and 30 is a maximum 63 dB and the attenuation value is controlled in units of 1 dB.

A plurality of 2-way dividers 16, 18, and 20 divide an RF signal from the mobile stations 62, 64 and 66 into two paths A and B of a base transceiver station individually. The attenuators 24, 28 and 32 prevent the mobile station power from being excessively input to the base transceiver stations 10, 12 and 14 and also generate path loss which is a fundamental requirement for an air environment simulation.

A plurality of 2-way dividers 34, 36 and 38 are coupled to the attenuator inputs for coupling a load in a reverse link of the base transceiver stations 10, 12 and 14. For providing a load source, an addictive white gaussian noise (AWGN) generator can be used. The 2-way dividers 34, 36 and 38 combine the provided load with an RF signal of the mobile station. A plurality of duplexers 40, 42 and 44 duplex a transmission signal and a received signal from the base transceiver stations 10, 12 and 14 into an RF signal for transmission to the mobile stations. Variable attenuators 46, 48 and 50 simulate a path loss and long-term effect of a real air environment and are set to a proper attenuation by control of the decoder circuit in the same manner as variable attenuators 22, 26 and 30. The long term effect may be defined as an attenuation effect which occurs in an actual long transmission line.

The plurality of 4-way dividers 52, 54 combine or divide signals from each of the base transceiver stations 10, 12 and 14 and delta modulation (DM) converters 56, 58 and 60 dividing the RF signal of mobile stations 62, 64 and 66 and convert the divided signals to an RS232 level for diagnosis of the synchronous data link control (SDLC) level.

Figure 2:
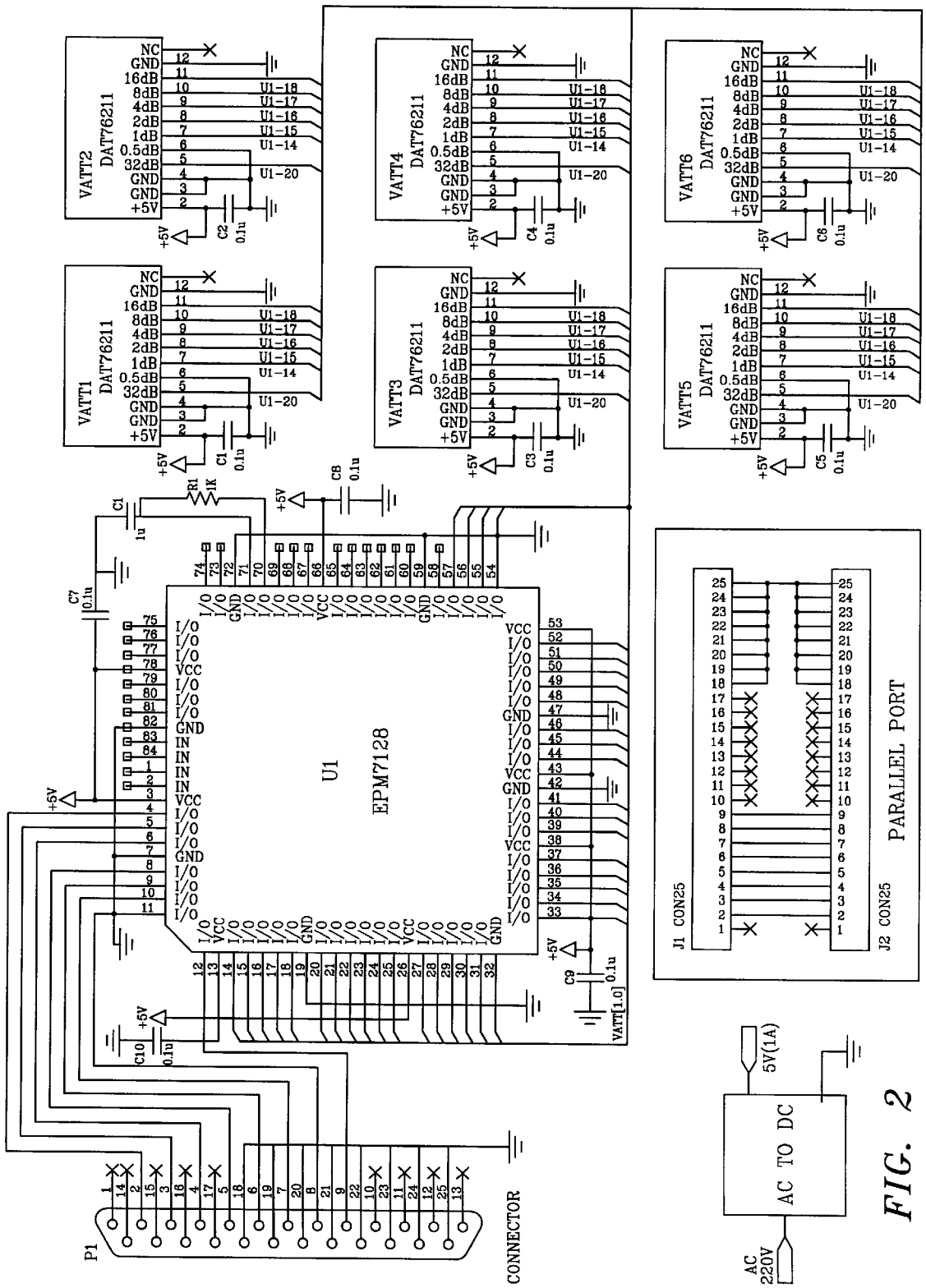
FIG. 2 is a wiring diagram schematic of variable attenuators from 1 to 6 in accordance with the present invention.

The decoder circuit 21 in response to a control input through a parallel port of the control computer 68 controls the variable attenuators 22, 26, 30, 46, 48 and 50. The core of the decoder circuit is an ALTERA EPM 712. All attenuation values for each attenuator is determined by the ALTERA EPM 712. A wiring diagram schematic of variable attenuators 22, 26, 30, 46, 48 and 50 in accordance with the present invention is shown in FIG. 2.

The control computer 68 controls the attenuators of the air interface simulator and displays the DM signal of the mobile station and the state of the virtual mobile station. The control computer 68 further includes software dedicated to the air interface simulator. The mobile stations 62, 64 and 66 and the base transceiver stations 10, 12 and 14 are all testees, which are tested.

Operational Overview

I. Forward Link

The operating principle of a preferred embodiment of an air interface simulator of the present invention is as follows. In a forward path, a transmission output of each BTS 10, 12, 14 is provided through variable attenuators 22, 26 and 30, respectively to duplexers 40, 42 and 44, respectively. The duplexer 40, 42, and 44 outputs are attenuated by an attenuation value at variable attenuators 46, 48 and 50, respectively, and combined at a 4-way divider 52, then divided by a 4-way divider 54 and finally input to each of the mobile stations 62, 64 and 66.

In the forward link, after the variable attenuators 46, 48 and 50 are set to 0 dB in an initialization state, the variable attenuators 22, 26 and 30 which are connected to the base transceiver stations 10, 12, and 14, respectively, should be set to provide the mobile stations 62, 64 and 66 with power of the same level, around 40 dB.

Monitoring of the power level provided to the mobile station is performed by a received signal strength indicator (RSSI) installed in the control computer 68.

II. Reverse Link

In a reverse link, an RF signal from each mobile station is combined and divided via a 4-way divider 52. The divided signals are attenuated by a path loss which is set in the forward link by variable attenuators 46, 48 and 50 and then output to a receiving port of duplexers 40, 42 and 44, respectively. The output signals are combined with an addictive white gaussian noise signals (AWGNs), which are received via input terminals 1, 2 and 3, respectively, and are divided by 2-way dividers 16, 18 and 20 via attenuators 24, 28 and 32 for level-buffer and maintenance. Output signals of the 2-way dividers 16, 18 and 20 are directed to an inlet port of the base transceiver stations 10, 12 and 14.

The decoder circuit 21 preferably includes an EPM 7128 altera chip as a core processor and receives attenuator addresses, and serial attenuation data from the parallel port of the control computer 68, controlling each of the air attenuators 46, 48 and 50 and calibration attenuators 22, 26 and 30.

The RSSI installed in the control computer communicates with a mobile station through a RS232 serial interface, receives common air interface (CAI) messages from the mobile station, and displays the current state of the mobile station through a graphical user interface. Also, the control switch installed in the control computer sets the attenuation value and controls the velocity of the mobile station and displays the state of the mobile station caused by a path loss in the state of an automatic movement menu.

Flow Diagrams

1. Forward Link

Figure 3:
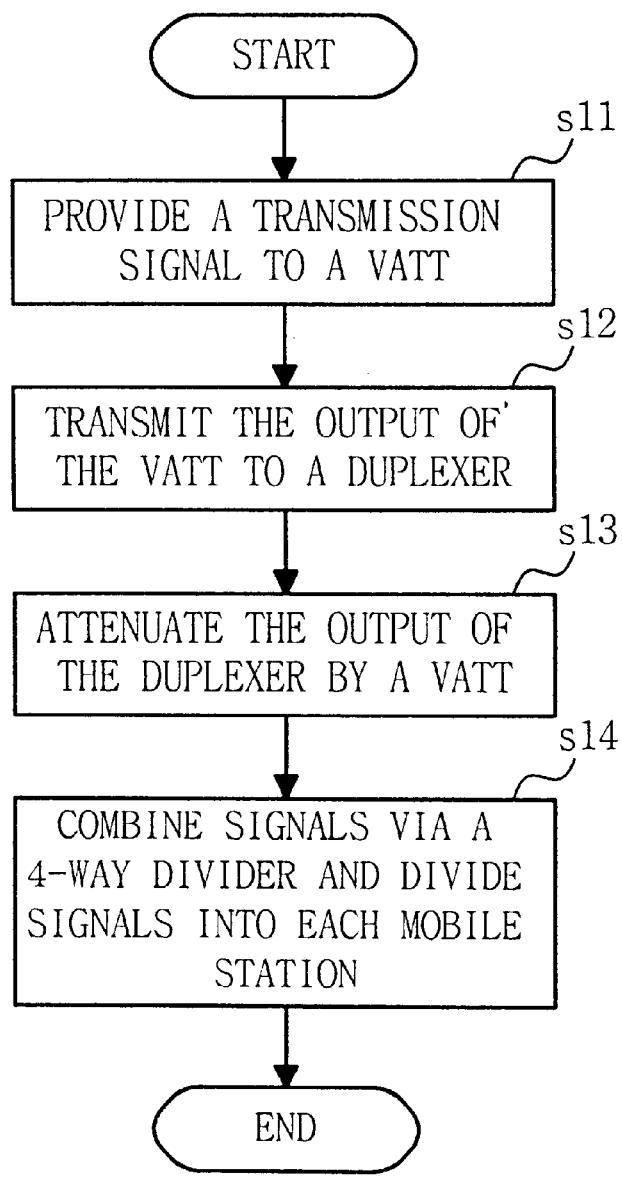
FIG. 3 is a flow diagram to illustrate a method of an air interface simulation in a forward link in accordance with the present invention.

FIG. 3 is a flow diagram to illustrate a method of an air interface simulation in a forward link in accordance with the present invention. Transmission signals which are output by base transceiver stations are input to variable attenuators 22, 26 and 30, at step 11. Output signals of the variable attenuators 22, 26 and 30 are provided to duplexers 40, 42 and 44, at step 12.

Output signals of the duplexers 40, 42 and 44 are attenuated by variable air attenuators 46, 48 and 50, at step 13, and being combined via a 4-way divider 52 and again being divided into each mobile station via a 4-way divider 54, at step 14.

2. Reverse Link

Figure 4:
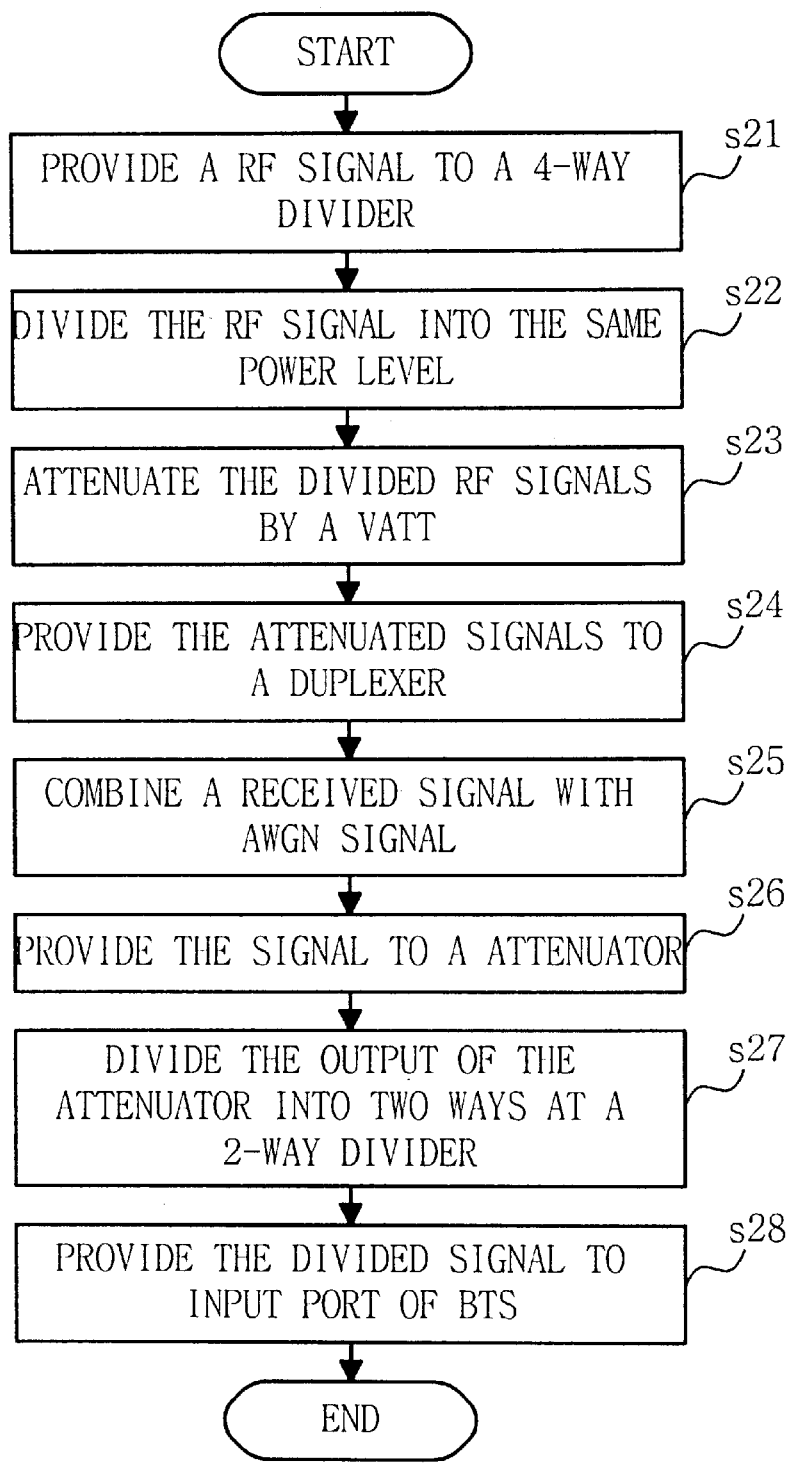
FIG. 4 is a flow diagram to illustrate a method of an air interface simulation in a reverse link in accordance with the present invention.

FIG. 4 is a flow diagram to illustrate a method of an air interface simulation in a reverse link in accordance with the present invention. Radio frequency (RF) signals which are provided by mobile stations sequentially are input to 4-way dividers 54 and 52, at step 21 and the output of the 4-way dividers is divided into power of the same level, at step 22. The divided RF signals are attenuated by variable attenuators 46, 48 and 50, at step 23.

The attenuated RF signals are inputted to duplexers 40, 42 and 44, at step 24. Outputs of the duplexers 40, 42 and 44 are combined at a 2-way divider 34 with an addictive white gaussian noise (AWGN) signal which is received via input ports 1, 2 and 3, respectively, at step 25 and are inputted to attenuators 24, 28 and 32 for level buffer and maintenance, at step 26.

Each of outputs of the attenuators 24, 28 and 32 is divided into two paths at 2-way divider, at step 27. The divided signals are transmitted into input ports of base transceiver stations 10, 12 and 14.

While the invention is susceptible to various modification and alternative forms, specific embodiments thereof have been shown by way of example in the drawings and detected description. It should be understood, however, that the present invention is not limited to the particular forms disclosed, but on the contrary, the intention is to cover all modifications, equivalents, and alternative falling within the spirit and scope of the invention as defined by the appended claims.

What is claimed is:

1. An air interface simulator comprising:
   a first plurality of variable attenuators for equally providing a mobile station with a transmission signal received from a base transceiver station (BTS) before said air interface simulator starts a driving simulation;
   a plurality of attenuators for generating a path loss to prevent power of said mobile station from being excessively input to said BTS and for simulating an air environment;
   a plurality of duplexers for duplexing a transmission signal and a received signal of said BTS into an RF signal of said mobile station;
   a plurality of 2-way dividers for providing a load in a reverse link of said BTS and combining the provided load and an RF signal of said mobile station;
   a second plurality of variable attenuators for simulating a path loss and a long term attenuation effect which occurs in an actual long transmission line, said second plurality of variable attenuators being connected to said plurality of duplexers, respectively;
   a first plurality of 4-way dividers for combining input signals from said BTS;
   a second plurality of 4-way dividers for combining input signals from said mobile station, and transmitting said combined signal to said first plurality of 4-way dividers; and
   a decoder circuit for controlling said first and second plurality of variable attenuators, said decoder circuit being provided with control input from a parallel port of a control computer.

2. The air interface simulator as set forth in claim 1, wherein said first and second plurality of variable attenuators are controlled by a binary code provided by said decoder circuit, attenuation values of said first and second plurality of variable attenuators are set to specific values by control of said binary code.

3. The air interface simulator as set forth in claim 2, wherein a controlling range of said first plurality of variable attenuators is between zero dB and 63 dB and said first plurality of variable attenuators are controlled in 1 dB increments.

4. The air interface simulator as set forth in claim 3, wherein said simulator outputs an RF signal of said mobile station to each of said BTSs through said attenuators and each of said output signals are divided into two paths of said BTS and are inputted to said BTS.

5. The air interface simulator as set forth in claim 1, wherein an additive white gaussian noise (AWGN) generator provides a load in a reverse link.

6. The air interface simulator as set forth in claim 1, wherein said decoder circuit includes an altera EPM7128 as a core processor.

7. The air interface simulator as set forth in claim 1, wherein said control computer of said air interface simulator includes dedicated software.

8. The air interface simulator as set forth in claim 1, wherein said air interface simulator can simulate a handoff environment for a maximum of 3 sectors.

9. The air interface simulator as set forth in claim 1, wherein said control computer is portable.

10. A method for air interface simulation in a forward link, comprising the steps of:
    attenuating a transmission signal of each base transceiver station (BTS) by a first variable attenuator;
    transmitting an output of said first variable attenuator to a duplexer;
    further attenuating an output of said duplexer by a second variable attenuator; and
    combining said further attenuated signal through a 4-way divider/combiner and dividing said combined signal to each mobile station.

11. The method as set forth in claim 10, further comprising a step of setting said first variable attenuators to provide each of said mobile stations with an equivalent power level after setting said second variable attenuator to 0 dB at the initiation of driving the air interface simulator.

12. The method as set forth in claim 11, wherein after providing said mobile stations with an equivalent power level, further comprising a step of connecting each of said first and second variable attenuators with one of said BTSs.

13. The method as set forth in claim 11, wherein said equivalent power level is approximately 40 db.

14. The method as set forth in claim 11, wherein monitoring of the power level input to said mobile station is performed by a received signal strength indicator (RSSI).

15. A method for air interface simulation in a reverse link, comprising the steps of:
    (i.) providing a radio frequency (RF) signal of a mobile station to a 4-way divider;
    (ii.) dividing said RF signal into divided RF signals having the same power level;
    (iii.) attenuating staid divided RF signals by a variable attenuator;
    (iv.) providing said attenuated RF signals to a duplexer;
    (v.) combining an output signal of said duplexer with an addictive white gaussian noise (AWGN) signal;
    (vi.) providing said combined signal to an attenuator for buffering and maintaining a level of said combined signal;
    (vii.) dividing an output signal of said attenuator into two paths using a two way divider; and
    (vii.) providing said divided output signal to input ports of a base transceiver station.

16. The method as set forth in claim 15, wherein said divided RF signals; are attenuated by a path loss value which is set in a forward link.

* * * * *